US007154861B1

(12) United States Patent
Merchant et al.

(10) Patent No.: US 7,154,861 B1
(45) Date of Patent: Dec. 26, 2006

(54) METHOD AND SYSTEM FOR A VIRTUAL LOCAL AREA NETWORK TO SPAN MULTIPLE LOOP FREE NETWORK TOPOLOGY DOMAINS

(75) Inventors: Shehzad T Merchant, Mountain View, CA (US); Brian W Bailey, Aptos, CA (US)

(73) Assignee: Extreme Networks, Santa Clara, CA (US)

( * ) Notice: Subject to any disclaimer, the term of this patent is extended or adjusted under 35 U.S.C. 154(b) by 534 days.

(21) Appl. No.: 10/163,179

(22) Filed: Jun. 3, 2002

Related U.S. Application Data

(63) Continuation of application No. 10/131,415, filed on Apr. 22, 2002, now abandoned.

(51) Int. Cl.
*H04L 12/56* (2006.01)
(52) U.S. Cl. .................. 370/254; 370/352; 370/401
(58) Field of Classification Search ............. 370/351, 370/389, 392, 396, 400–408, 216–223; 714/712, 714/717
See application file for complete search history.

(56) References Cited

U.S. PATENT DOCUMENTS

| 5,825,772 | A  | * | 10/1998 | Dobbins et al. | ............. | 370/396 |
|---|---|---|---|---|---|---|
| 6,085,238 | A  | * | 7/2000 | Yuasa et al. | ................ | 709/223 |
| 6,195,351 | B1 | * | 2/2001 | Hiscock et al. | ............. | 372/389 |
| 6,711,171 | B1 | * | 3/2004 | Dobbins et al. | ............. | 370/400 |
| 6,766,482 | B1 | * | 7/2004 | Yip et al. | .................... | 714/717 |
| 6,894,999 | B1 | * | 5/2005 | Acharya | ...................... | 370/352 |
| 2002/0023170 | A1 | * | 2/2002 | Seaman et al. | ............. | 709/235 |
| 2002/0146008 | A1 | * | 10/2002 | Kaplen | ........................ | 370/390 |
| 2002/0191250 | A1 | * | 12/2002 | Graves et al. | ............. | 359/128 |
| 2003/0169694 | A1 | * | 9/2003 | Seaman | ...................... | 370/254 |
| 2004/0117653 | A1 | * | 6/2004 | Shapira et al. | ............. | 713/201 |
| 2004/0223463 | A1 | * | 11/2004 | MacKiewich et al. | ...... | 370/256 |
| 2005/0180345 | A1 | * | 8/2005 | Meier | ........................ | 370/310 |

OTHER PUBLICATIONS

U.S. Appl. No. 09/999,796 titled Ethernet Automatic Protection Switching filed Oct. 31, 2001 inventors Yip et al. Application Pending.
Understanding Spanning—Tree Protocol Appendix C—Cisco Systems 1989-1999—pp. C-1 through C-12.

* cited by examiner

*Primary Examiner*—Chi Pham
*Assistant Examiner*—Roberta A. Shand
(74) *Attorney, Agent, or Firm*—Blakely, Sokoloff, Taylor & Zafman

(57) ABSTRACT

A method and system is provided for a virtual local network to span multiple loop free network topology domains. According to one aspect of the invention, a network contains at least two loop free network topology domains and a virtual local area network spanning at least a portion of each of the two domains. According to one aspect of the invention, a network architecture comprises a plurality of nodes connected by paths, a first physical broadcast domain and a second physical broadcast domain each comprising a separate subset of the plurality of nodes, and a logical broadcast domain comprising a node from each subset.

8 Claims, 2 Drawing Sheets

METHOD AND SYSTEM FOR A VIRTUAL LOCAL AREA NETWORK TO SPAN MULTIPLE LOOP FREE NETWORK TOPOLOGY DOMAINS

The present patent application is a Continuation of prior application Ser. No. 10/131,415, filed Apr. 22, 2002 now abandoned.

BACKGROUND OF THE INVENTION

1. Field of the Invention

The invention relates to the field of virtual local area networks (VLANs). In particular, the invention relates to a virtual local area network spanning multiple loop free network topology domains.

2. Background Information and Description of Related Art

A virtual local area network (VLAN) restricts communication between computers in a network on some network administrator defined basis rather than, for example, the physical location of the computers. The computers in the VLAN communicate with each other as if they are connected to the same local area network (LAN) segment even though they may actually be physically located on different segments of an internetwork. Conversely, computers connected to the same network segment may not necessarily be able to communicate with each other if, for example, they belong to different VLANs.

Networks, such as LANs, are often partitioned into multiple electrically separate segments to increase network performance. Bridges or switches connect the segments. A network may include redundant bridges and paths to provide backup routes in the event of a bridge or path failure in the network. The Spanning Tree Protocol (STP), part of the IEEE 802.1D standard, defines an algorithm that provides for this redundancy while preventing undesirable traffic loops in a LAN that can otherwise cause unwanted duplication of data packets. Using the algorithm, bridges select a root bridge, calculate path costs, and select a single path to the root bridge from among multiple redundant paths. After path costs are calculated and a single path is selected, the bridges block the redundant paths from carrying traffic unless the selected path or a bridge along the selected path fails.

There are two common approaches to running STP with VLANs. One approach, specified in the IEEE 802.1Q standard, is to run a single STP instance for all VLANs. This approach is scalable for different sizes of networks, but does not provide load-balancing capability. Since all VLANs participate in the same spanning tree, redundant paths are unused, while some active links may be overloaded. Therefore, the bandwidth capability of the network is not fully utilized.

Another approach is to run a distinct STP instance for each VLAN. This approach provides load-balancing capability, but does not scale well as the network grows. Running a separate STP instance for each VLAN may create undesirable amounts of processing and network traffic overhead and administrative burden to the network administrator.

SUMMARY

According to one aspect of the invention, a network comprises at least two loop free network topology domains and a virtual local area network spanning at least a portion of each of the two domains.

According to one aspect of the invention, a network architecture comprises a plurality of nodes connected by paths, a first physical broadcast domain comprising a subset of the plurality of nodes, a second physical broadcast domain comprising a separate subset of the plurality of nodes, and a logical broadcast domain comprising one or more nodes from each subset.

According to one aspect of the invention, an internetwork comprises a metropolitan area network and a private network made up of physically separate networks coupled to the metropolitan area network to facilitate communication therebetween. A first logical network comprising the private network and the metropolitan area network facilitates secure communication between the separate and physical networks. The internetwork further comprises a second private network of physically separate networks coupled to the metropolitan area network to facilitate communication therebetween, and a second logical network comprising the second private network and the metropolitan area network to facilitate secure communication.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION OF THE INVENTION

Embodiments of a system and method for a virtual local network to span multiple loop free network topology domains are described. In the following description, numerous specific details are provided for a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
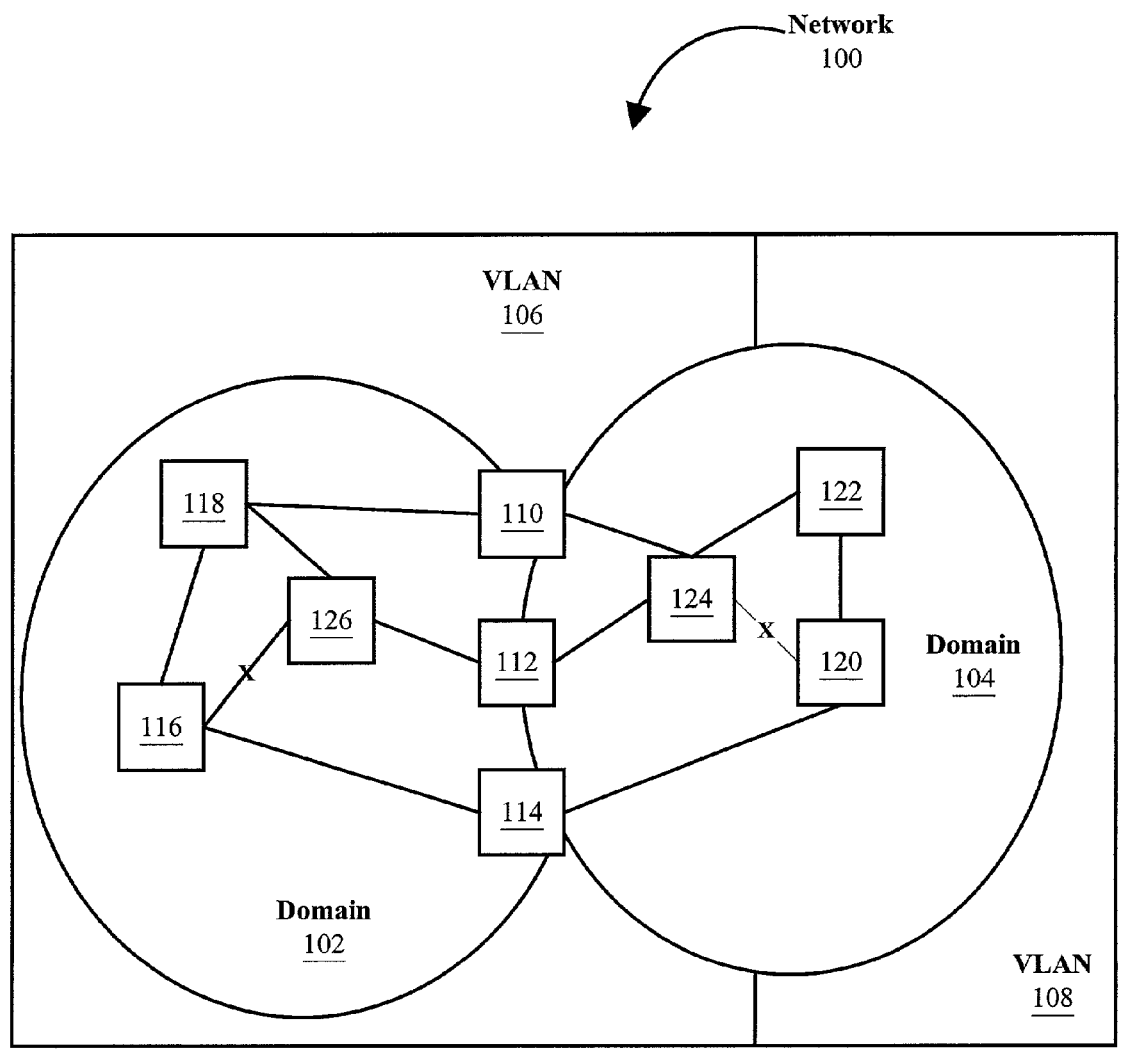
FIG. 1 illustrates one embodiment of a network implementing the invention.

Referring to FIG. 1, a block diagram illustrates a network 100 according to one embodiment of the invention. Those of ordinary skill in the art will appreciate that the network 100 may include more components than those shown in FIG. 1. However, it is not necessary that all of these generally conventional components be shown in order to disclose an illustrative embodiment for practicing the invention. Network 100 contains at least two domains 102 and 104. Each domain is a set of one or more nodes or switches that are administered as a unit. For example, if the network runs the spanning tree protocol (STP), then each domain runs a separate instance of STP. The nodes are connected by paths. One or more of the paths may be redundant to provide backup routes in the event of a path failure. For example, there is a path from node 116 to node 126 directly and a path from node 116 to node 126 through node 118. In one embodiment, the domains are loop free network topology domains that have redundant paths blocked. For example, in domain 102, there is a redundant path from node 116 to node 126, which creates a loop between nodes 116, 118, and 126. If the path from node 116 directly to node 126 is blocked (indicated by an X in FIG. 1), the domain 102 will be loop free, since there are no other redundant paths or loops within domain 102. Domain 104 has a redundant path from node 120 to node 124, which creates a loop between nodes 120, 122, and 124. By blocking the path from node 120 directly to node 124, domain 104 will be loop free, since there are no other redundant paths or loops within domain 104. In one embodiment, the domains are physical broadcast domains, which each contain a separate subset of the nodes in the network.

In one embodiment, the domains are maintained loop free in accordance with a spanning tree protocol (STP). For example, the two domains 102 and 104 may be spanning tree protocol domains (STPD) operating in network 100. STPD 102 contains nodes 110, 112, 114, 116, 118, and 126. STPD 104 contains nodes 110, 112, 114, 120, 122, and 124. One or more nodes or switches may be members of more than one domain. For example, nodes 110, 112, and 114 are members of both STPD 102 and STPD 104. STP blocks the path from node 116 directly to node 126 to maintain STPD 102 loop free and blocks the path from node 120 directly to node 124 to maintain STPD 104 loop free.

In one embodiment, the spanning tree protocol operates in accordance with the IEEE 801.D standard. In an alternative embodiment, the spanning tree protocol operates in accordance with the IEEE 802.1W standard, known as rapid STP.

In one embodiment, the domains are maintained loop free in accordance with an Ethernet Automatic Protection Switching Protocol (EAPS). EAPS prevents loops in a Layer-2 (L2) network having a ring topology. The EAPS system comprises an EAPS domain having a control virtual local area network (VLAN) and at least one protected data VLAN. There is a master node linked to at least one transit node in a ring network. Each node has a primary port and a secondary port. EAPS operates in conjunction with the master node to detect a network failure by means of control messages sent between the nodes using the control VLAN. During normal operation, the master node blocks the protected data VLAN traffic from traversing its secondary port. During a network failure, the master node reroutes the protected data VLAN traffic through its secondary port. Thus, similar to STP, EAPS blocks ports to prevent loops in a ring topology running L2 traffic.

In one embodiment, the domains are maintained loop free in accordance with Dynamic Packet Transport (DPT). DPT is a solution for a Resilient Packet Rings (RPR) network. RPR is a new MAC layer used in high-speed metropolitan networks to efficiently transport significant amounts of Internet Protocol (IP) and other data, including Ethernet. DPT uses a bidirectional dual counter-rotating ring topology. There is an inner ring and an outer ring. Both rings are concurrently utilized for transporting data and control packets. Generally, control packets propagate in the opposite direction from the corresponding data packets. For example, data packets may be transported by the outer ring clockwise and the control packets may be transported in the inner ring counterclockwise. The control packets handle tasks such as topology discovery, protection switching, and bandwidth control. The Intelligent Protection Switching (IPS) allows the ring to rapidly recover from a node failure by wrapping traffic around the failure.

In one embodiment, the domains are geographically distributed domains. For example, the nodes in a city may be contained in one domain, while the nodes in another city may be contained in a different domain.

In one embodiment, network 100 contains a virtual local area network (VLAN) spanning at least a portion of each of the two physical broadcast domains and a logical broadcast domain comprising at least one node from each of the physical broadcast domains. For example, as shown in FIG. 1, network 100 contains two VLANs 106 and 108. Each VLAN contains one or more nodes or switches. VLAN 108 contains nodes 120 and 122. VLAN 106 contains nodes 110, 112, 114, 116, 118, 124, and 126. Thus, VLAN 106 spans at least a portion of each of the two domains 102 and 104. By allowing a VLAN to be part of multiple domains, traffic can be carried across geographically or logically distributed sites, while the network can still be built out of smaller, better managed topologies.

Figure 2:
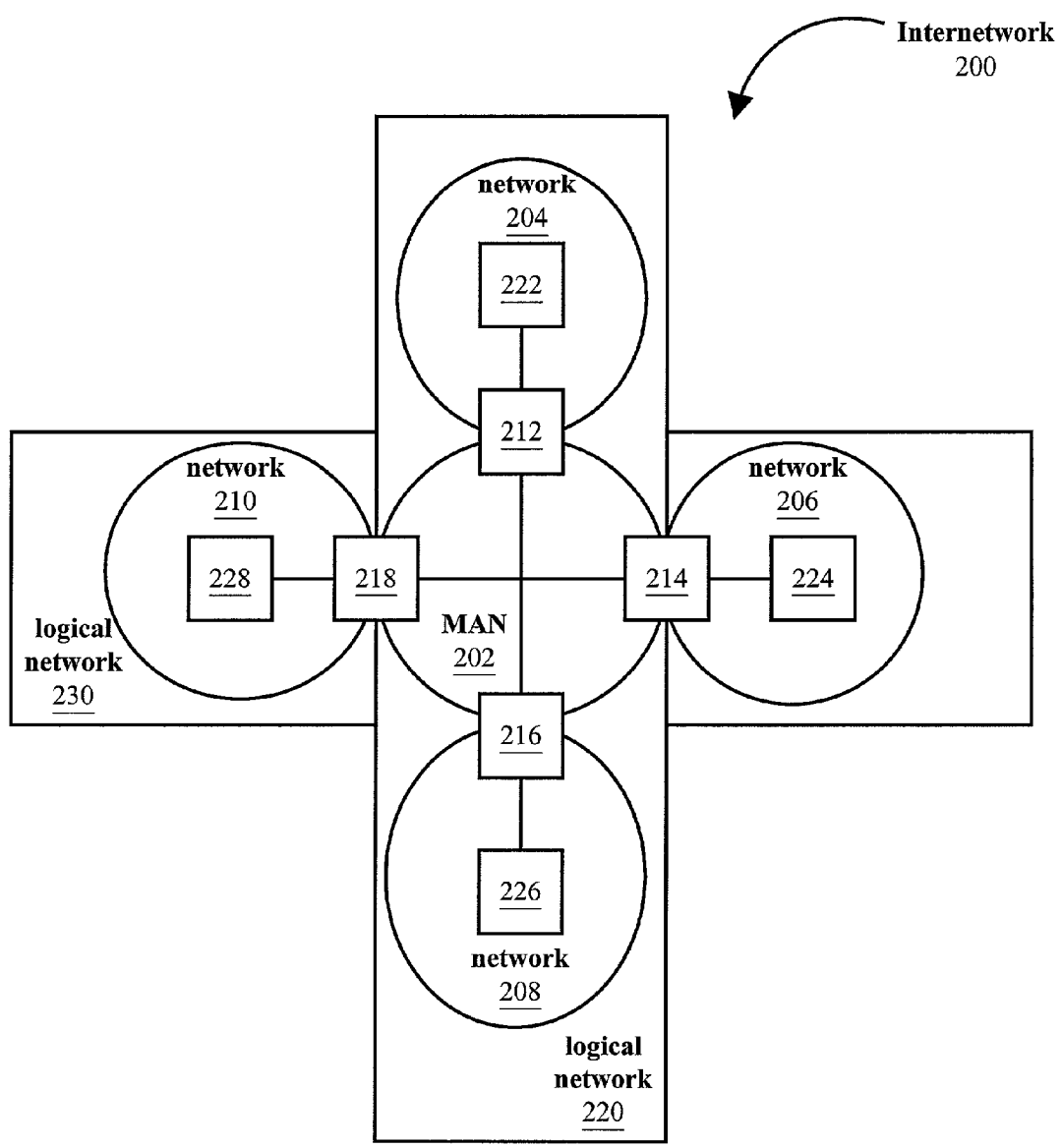
FIG. 2 illustrates one embodiment of an internetwork implementing the invention.

Referring to FIG. 2, an internetwork 200 contains a metropolitan area network (MAN) 202. Internetwork 200 also contains one or more private networks. Each private network contains at least two physically separate networks coupled to the MAN to facilitate communication therebetween. For example, as shown in FIG. 2, internetwork 200 has four separate networks 204, 206, 208, and 210. Each network contains one or more nodes. For example, network 204 contains nodes 212 and 222, network 206 contains nodes 214 and 224, network 208 contains nodes 216 and 226, and network 210 contains nodes 218 and 228. Networks 204 and 208 comprise a first private network. Networks 206 and 210 comprise a second private network. Each network is coupled to MAN 202.

In one embodiment, each private network is maintained loop free in accordance with, for example, a separate instance of spanning tree protocol. In other embodiments, each private network is maintain loop free in accordance with other protocols, such as a dynamic packet transport protocol or an ethernet automatic protection switching protocol.

Internetwork 200 also contains one or more logical networks. Each logical network contains a private network and the MAN 202 to facilitate secure communication therebetween. For example, logical network 220 contains MAN 202 and the first private network. The first private network comprises network 204 and network 208. Logical network 230 contains MAN 202 and the second private network. The second private network comprises network 206 and network 210. In one embodiment, communication between the first and second logical networks is prohibited.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A network comprising:
   at least two loop free network topology domains, including a first network topology domain and a second network topology domain, each of the network topology domains including a separate spanning tree protocol instance; and
   a virtual local area network spanning at least a portion of the first network topology domain and a portion of the second network topology domain, the portion of the first network topology domain including a sub-portion that is not included in the portion of the second network topology domain, the virtual local area network excluding a portion of at least one of the network topology domains.

2. The network of claim 1, wherein each network topology domain is maintained loop free in accordance with the spanning tree protocol instance for the domain.

3. The network of claim 2, wherein the spanning tree protocol operates in accordance with the IEEE 802.1D standard.

4. The network of claim 2, wherein the spanning tree protocol operates in accordance with the IEEE 802.1W standard.

5. The network of claim 1, wherein the domains are geographically distributed domains.

6. The network of claim 1, wherein each domain comprises a plurality of network switches at least one of such switches being a member of both domains.

7. An internetwork comprising:
   a metropolitan area network;
   a first private network comprising at least two physically separate networks, each of the two physically separate networks in the first private network being coupled to the metropolitan area network;
   a first logical network comprising the first private network and the metropolitan area network to facilitate secure communication therebetween;
   a second private network comprising at least two physically separate networks, each of the two physically separate networks in the second private network being coupled to the metropolitan area network; and
   a second logical network comprising the second private network and the metropolitan area network to facilitate secure communication therebetween;
   wherein each of the private networks is maintained loop free in accordance with a separate instance of spanning tree protocol, and wherein the first logical network excludes at least a portion of the second private network and the second logical network excludes at least a portion of the first private network.

8. The internetwork of claim 7, wherein communication between the first and second logical networks is prohibited.

\* \* \* \* \*